(12) United States Patent
Zhou (10) Patent No.: US 12,104,743 B1
(45) Date of Patent: Oct. 1, 2024

(54) FAN WITH DOUBLE EASY-INSTALLING BUCKLES

(71) Applicant: Jun Zhou, Boluo (CN)

(72) Inventor: Jun Zhou, Boluo (CN)

( * ) Notice: Subject to any disclaimer, the term of this patent is extended or adjusted under 35 U.S.C. 154(b) by 0 days.

(21) Appl. No.: 18/408,499

(22) Filed: Jan. 9, 2024

(51) Int. Cl.
*F16M 11/00* (2006.01)
*F04D 29/60* (2006.01)
*F16M 11/20* (2006.01)
*F16M 11/24* (2006.01)

(52) U.S. Cl.
CPC .......... *F16M 11/20* (2013.01); *F04D 29/601* (2013.01); *F16M 11/247* (2013.01); *F16M 2200/08* (2013.01)

(58) Field of Classification Search
CPC ............... F16M 11/20; F16M 2200/08; F16M 2200/00; F04D 29/601; F04D 29/602; F04D 29/441; F04D 25/08; F24D 29/626; F14F 13/32
See application file for complete search history.

(56) References Cited

U.S. PATENT DOCUMENTS

| | | | | |
|---|---|---|---|---|
| D885,555 S | * | 5/2020 | Wang | D23/382 |
| D898,180 S | * | 10/2020 | Du | D23/382 |
| D910,160 S | * | 2/2021 | Hsu | D23/382 |
| D923,773 S | * | 6/2021 | Wang | D23/382 |
| 11,619,342 B1 | | 4/2023 | Chen | |
| 2010/0226749 A1 | * | 9/2010 | Gammack | F24F 13/32 |
| | | | | 415/90 |
| 2010/0226754 A1 | * | 9/2010 | Hutton | F04D 25/08 |
| | | | | 416/244 R |

FOREIGN PATENT DOCUMENTS

| | | | | | |
|---|---|---|---|---|---|
| CN | 105927567 A | * | 9/2016 | | F04D 25/08 |
| CN | 206054347 U | * | 3/2017 | | |
| CN | 107514370 A | * | 12/2017 | | |
| CN | 210770350 U | * | 6/2020 | | |

* cited by examiner

*Primary Examiner* — Tan Le
(74) *Attorney, Agent, or Firm* — Ying-Ting Chen; Law Office Michael Chen (57) ABSTRACT

A fan with double easy-installing buckles, includes a fan, a fan shell, an installation base, a base shell, and a middle partition plate. One end of the fan is sleeved with the double buckle, and the end of the double buckle away from the fan is sleeved with the supporting bracket; the top of the fan shell is provided with the fan top inner cavity, and the top inner cavity of the fan top is equipped with the sliding track and the positioning groove; the bottom surface of the installation base is thread connected to the fixing bottom plate. Firstly, the present invention can effectively avoid the situation to align the buckle with the hole during installation for traditional fan, making the overall installation process more time-saving and labor-saving.

6 Claims, 8 Drawing Sheets

FAN WITH DOUBLE EASY-INSTALLING BUCKLES

FIELD OF THE INVENTION

The present invention relates to the field of fans, in particular to a fan with double easy-installing buckles.

BACKGROUND OF THE INVENTION

Electric fan, also known as the fan, is the household appliance that the rotation of fan blades are driven by the electric motor to accelerate air circulation, which is mainly used for cooling, air circulation and widely used in homes, classrooms, offices, shops, hospitals, hotels and other places. Metal fan, also known as metal electric fan, refers to the manufacturing material of the electric fan being metal, such as iron and copper. In developed countries in Europe and America, metal fans have become high-end home decorations with their unique artistic charm and metal texture, and are welcomed and loved by consumers. This trend has been brought to China and is affecting more and more families.

Traditional fans cannot be quickly and randomly installed directly through double buckles during use, and it is impossible to clamp directly. Traditional fan requires aligning the buckles with the holes, which is time-consuming and labor-consuming for installing. At the same time, there is no spring in the middle of the double buckles, which cannot be reset through the spring. In addition, traditional fans cannot rotate after the buckles are clamped, and it is not convenient during disassembly. The overall usage effect is poor, making it difficult to complete the installation and disassembly quickly. Therefore, those skilled in this field provides a double hidden-buckle fan to solve the problems mentioned in the above background.

SUMMARY OF THE DISCLOSURE

The purpose of the present invention is to provide a fan with double easy-installing buckles, in order to solve the problem that traditional fans proposed in the background technology cannot be quickly and randomly installed and directly clamped with dual buckles during use. Traditional fans require aligning the buckles with the holes during installation, which is time-consuming and labor-consuming. At the same time, there is no spring in the middle of the dual buckles, It is impossible to reset through springs, and traditional fans cannot rotate after being clamped when disassembling. The overall use effect is poor, making it difficult to complete installation and disassembly quickly.

In one aspect, a fan with double easy-installing buckles, comprising the fan, the fan shell, the installation base, the base shell, and the middle partition plate, characterized in that one end of the fan is sleeved with the double buckle, and one end of the double buckle far away from the fan is sleeved with the supporting bracket; the top of the fan shell is equipped with the fan top inner cavity, the inner cavity at the top of the fan is equipped with the sliding track and the positioning groove; the bottom surface of the installation base is thread connected to the fixing bottom plate; the top surface of the installation base is provided with the pressing block A, pressing block B, and compression spring; the top surface of the pressing block A, pressing block B and the compression spring are thread connected to the buckle cover plate, and both the pressing block A and the pressing block B are internally provided with circular holes; both sides of the middle partition plate are equipped with fixing columns, the bottom of the middle partition plate is fixedly connected to the base shell, the base shell is provided with the installation inner cavity, and installation inner cavity is internally fitted with the supporting bracket.

As a preferred embodiment of the invention, the numbers of positioning grooves could be four, six, eight, etc. and the positioning grooves are uniformly distributed on the sliding track.

As a preferred embodiment of the invention, the fan comprises the fan shell, the fan top inner cavity, the sliding track, and the positioning groove.

As a preferred embodiment of the invention, the pressing block A and the pressing block B are oppositely arranged, and the pressing block A and the pressing block B are distributed in the H-shape, with the compression spring positioned in the groove of H-shaped between the pressing block A and the pressing block B.

As a preferred embodiment of the invention, the double buckle comprises the pressing block A, the pressing block B, the buckle cover plate, the compression spring, the installation base, the fixing bottom plate, and the circular hole.

As a preferred embodiment of the invention, the installation base comprises the base shell, the installation inner cavity, the middle partition plate, and the fixing column.

Compared with conventional fans, the present invention is advantageous because the present invention is a fan with double easy-installing buckles, which could solve the problems that the traditional fans cannot be quickly and randomly installed during use. The double buckle in present invention could be directly clamped, effectively avoiding requirement of aligning the buckle with the hole during installation of traditional fans, the overall installation process could be more time-saving and labor-saving. At the same time, there is a spring in the middle of the double buckle, the use of double buckles could be more convenient by using springs for resetting. Furthermore, the present fan could rotate even after the buckles are tightened, it could be more convenient during disassembling. The overall use effect could be better, allowing for quick installation and disassembling. The special connection design allows for connection through fixed grooves at specific positions, while maintaining randomly rotation in other parts. The fan is fixed by interlocking with internal grooves at specific positions, the top cavity is formed at the top of the fan shell, which is provided with sliding tracks and fixing parts to work together with the connection points. Through special connection design, the fan could be clamped in the position that needs to be fixed, while maintaining randomly rotation in other places, improving the installation efficiency and flexibility of the fan, and avoiding the traditional cumbersome installation methods.

BRIEF DESCRIPTION OF THE DRAWINGS

Other features, objects and advantages of the present invention will become more apparent through the detailed description of the non-limiting embodiments with reference to the following drawings.

DETAILED DESCRIPTION OF THE PREFERRED EMBODIMENTS

Referring to FIGS. 1-8, in the embodiment of the present invention, a fan with double easy-installing buckles, comprises the fan 1, the fan shell 101, the installation base 205, the base shell 2051, and the middle partition plate 2053. One end of fan 1 is sleeved with the double buckles 2, and the end of the double buckles 2 away from fan 1 is sleeved with the supporting bracket 3. This could solve the problems that the traditional fans cannot be quickly and randomly installed and cannot be directly clamped during use, the double buckles in the present invention could achieve the effect of clamping directly and could effectively avoid the requirements of aligning the buckles with the holes during installation. Which could be more convenient during the blind installation process. The top of the fan shell 101 is provided with the fan top inner cavity 102, the top inner cavity 102 is provided with the sliding track 103 and the positioning groove 104; the bottom surface of the installation base 205 is thread connected the fixing bottom plate 206, and the top surface of the installation base 205 is provided with the pressing block A 201, pressing block B 202 and compression spring 204, as well as multiple positioning grooves 104 and sliding tracks 103, which could facilitate the directly connection between double buckles 2 and fan 1. During blind installation, the fan 1 is connected with double buckles 2, firstly, inserted into the sliding track 103, and then rotated until connected to the positioning groove 104, it could be clamped and the randomly installation could be achieved. Multiple positioning grooves 104 are provided to enhance the clamping effect, and the overall clamping process could be smoother. The installation inner cavity 2052 is provided inside the base shell 2051, which clamps the pressing block A 201, pressing block B 202, and compression spring 204 together; the compression spring 204 is set in the H-shaped groove between the pressing block A 201 and the pressing block B 202, the compression spring 204 is fixed in the circular hole 207, makes it become more stable and avoid causing displacement in position, which facilitates installation and prevents the compression spring 204 from jumping out during compression, enhancing the effectiveness of use. The top surface of the pressing block A 201, pressing block B 202 and the compression spring 204 are thread connected to the buckle cover plate 203, the pressing block A 201 and the pressing block B 202 are both provided with the circular hole 207; both sides of the middle partition plate 2053 are provided with fixing columns 2054, the bottom of the middle partition plate 2053 is fixedly connected to the base shell 2051, the base shell 2051 is provided with the installation inner cavity 2052, the installation inner cavity 2052 is internally sleeved with the supporting bracket 3.

Figure 1:
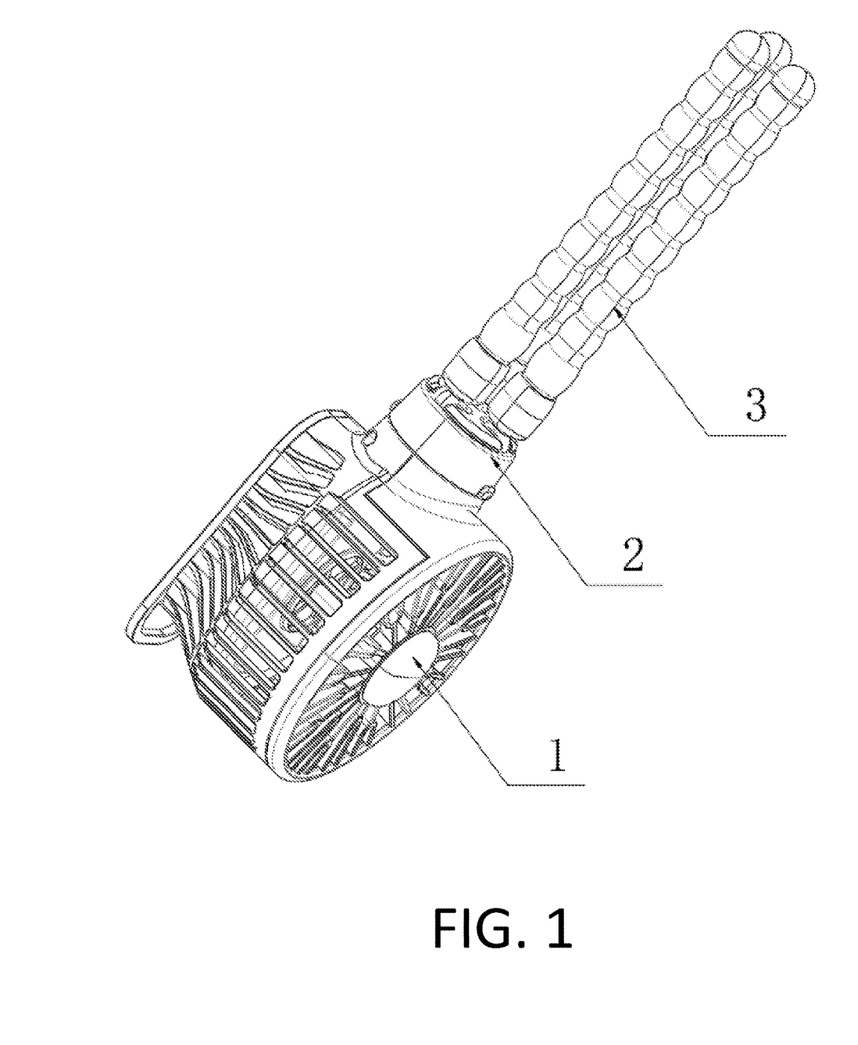
FIG. 1 is the perspective view of the overall structure of a fan with double easy-installing buckles.
Figure 2:
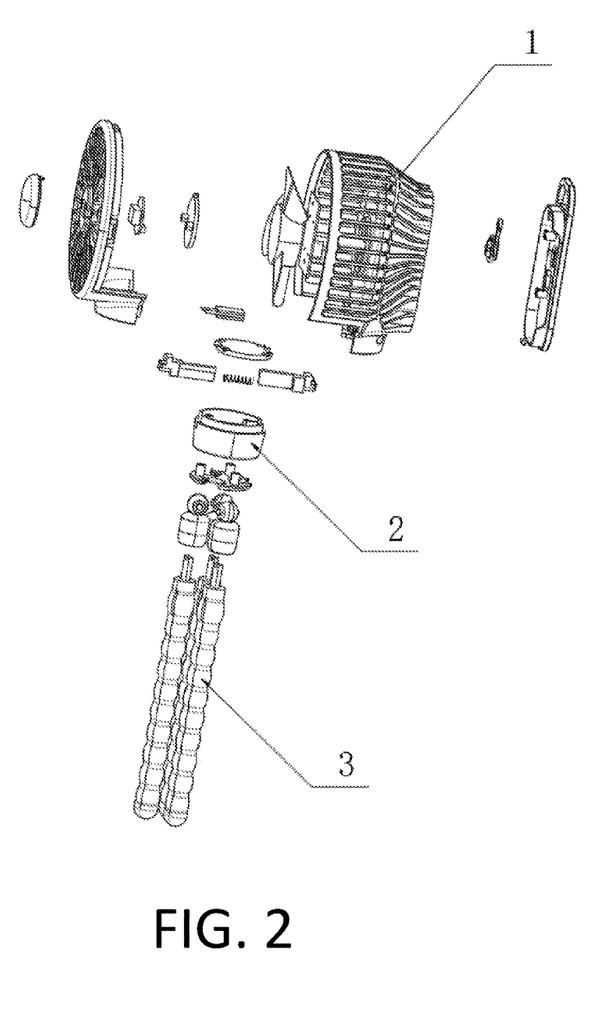
FIG. 2 is the explosive structural view of the overall structure of a fan with double easy-installing buckles.
Figure 3:
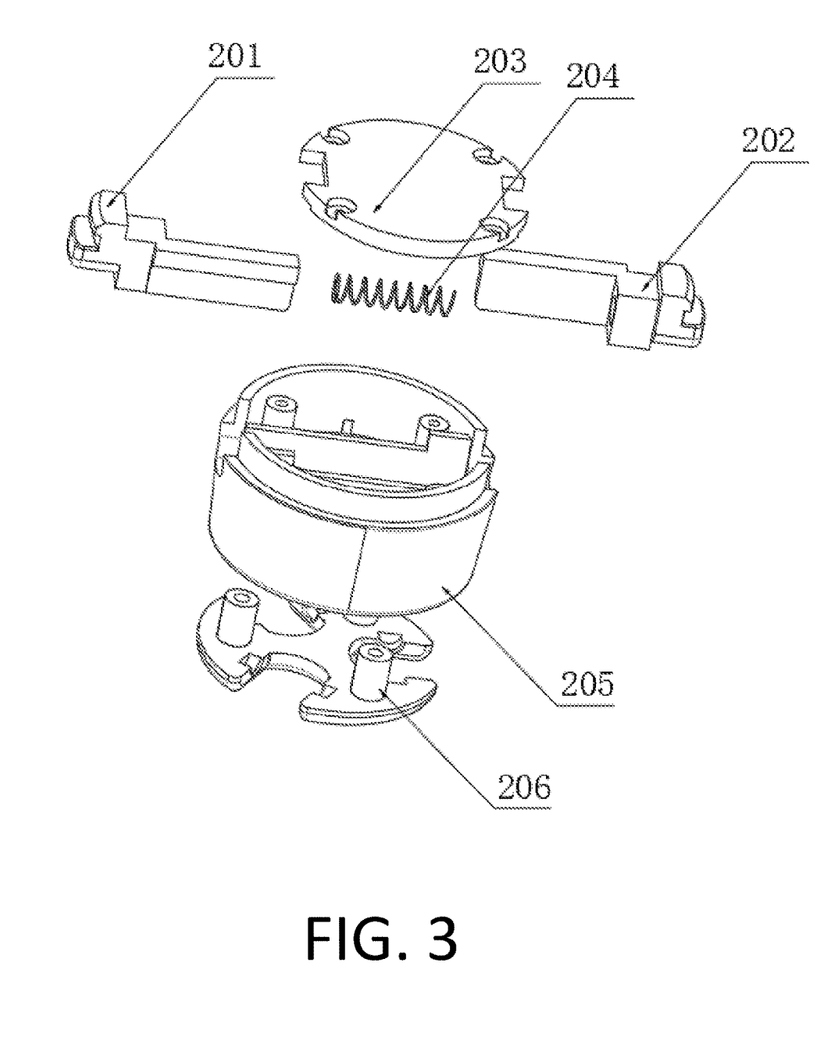
FIG. 3 is the explosive structural view of the double buckle.
Figure 4:
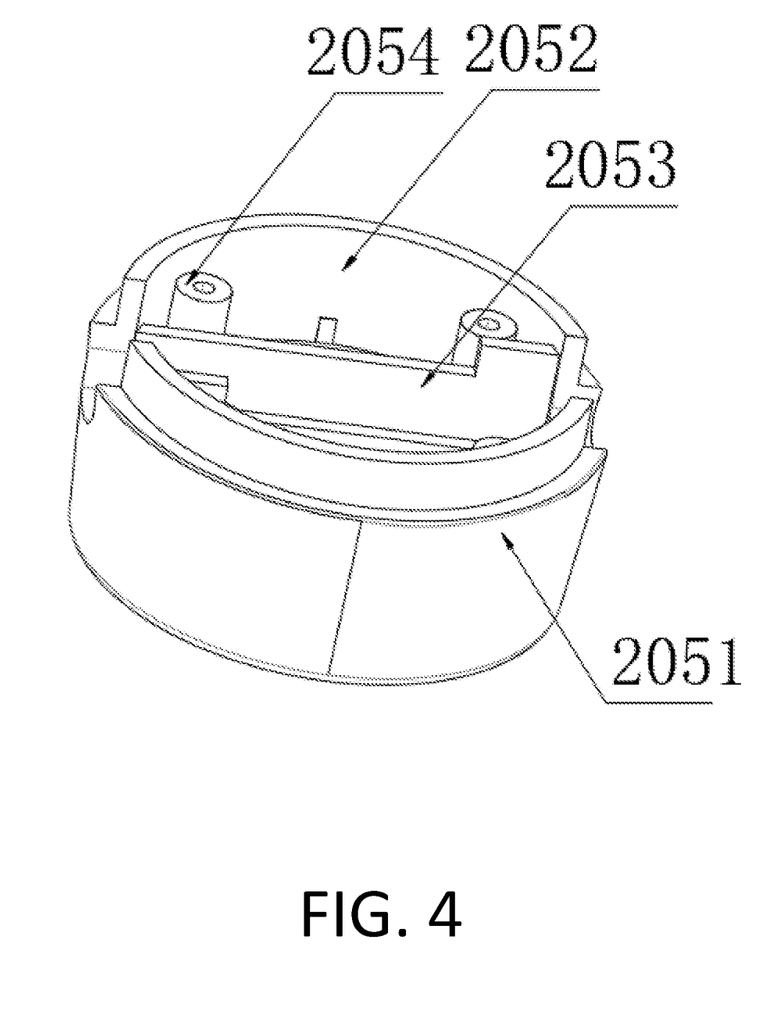
FIG. 4 is the perspective view of the installation base.
Figure 5:
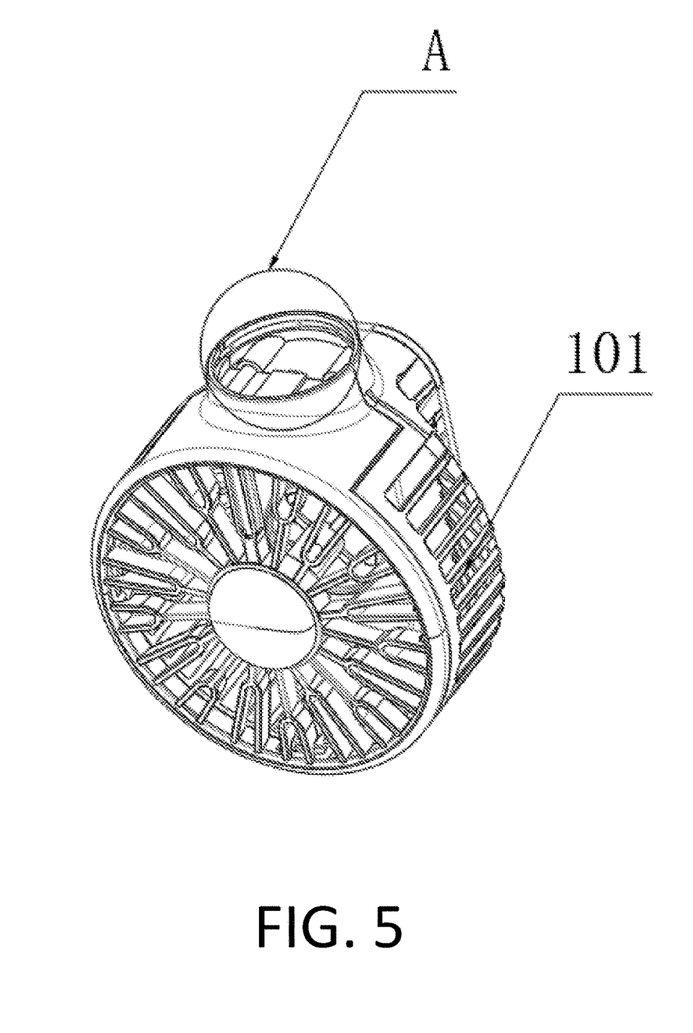
FIG. 5 is the perspective view of the fan.
Figure 6:
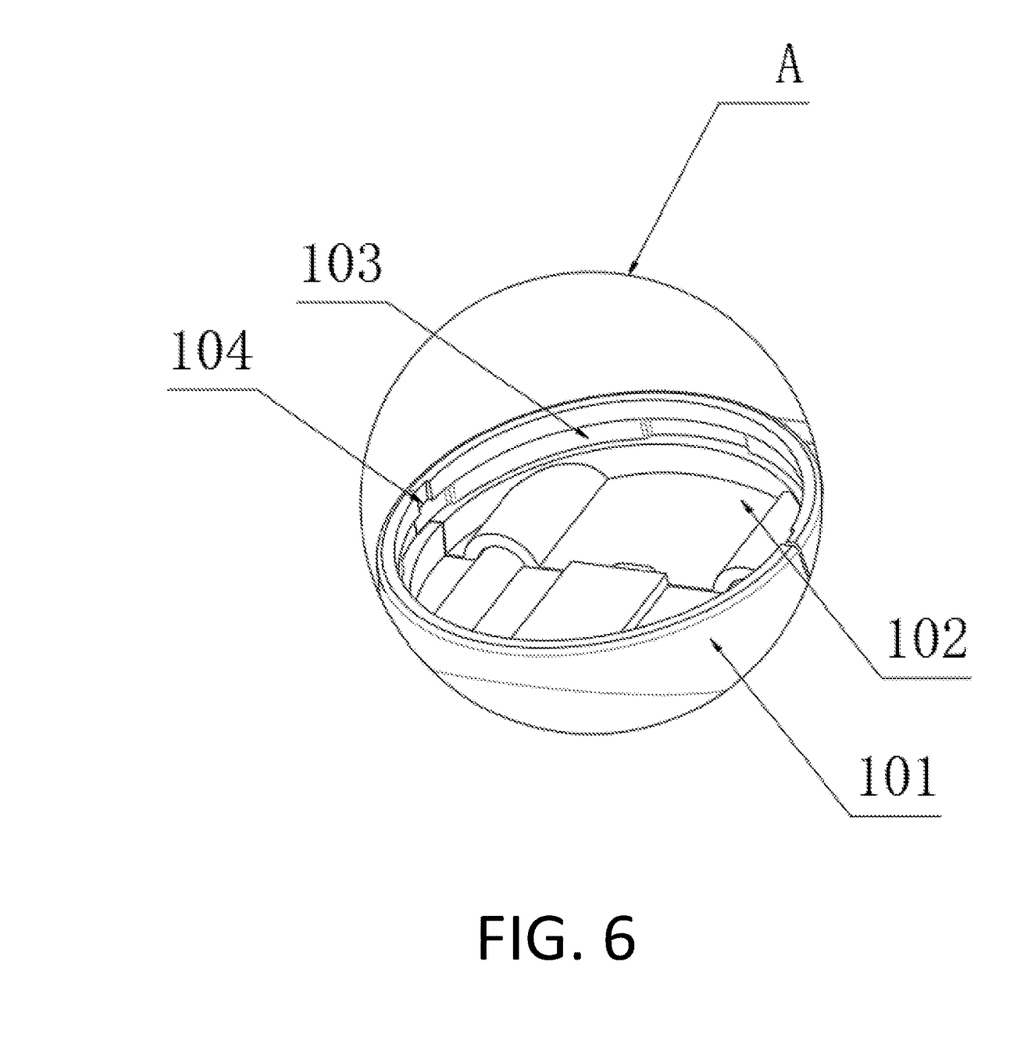
FIG. 6 is the internal structural view of the fan.
Figure 7:
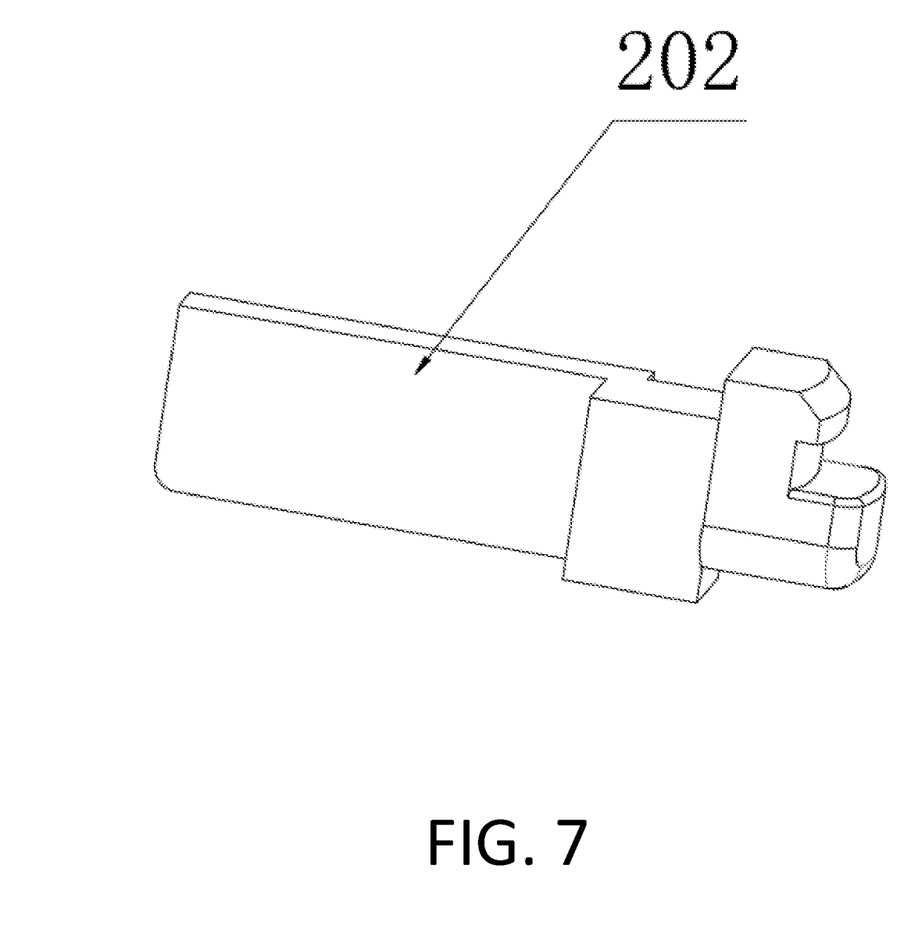
FIG. 7 is the perspective view of the pressing block B.
Figure 8:
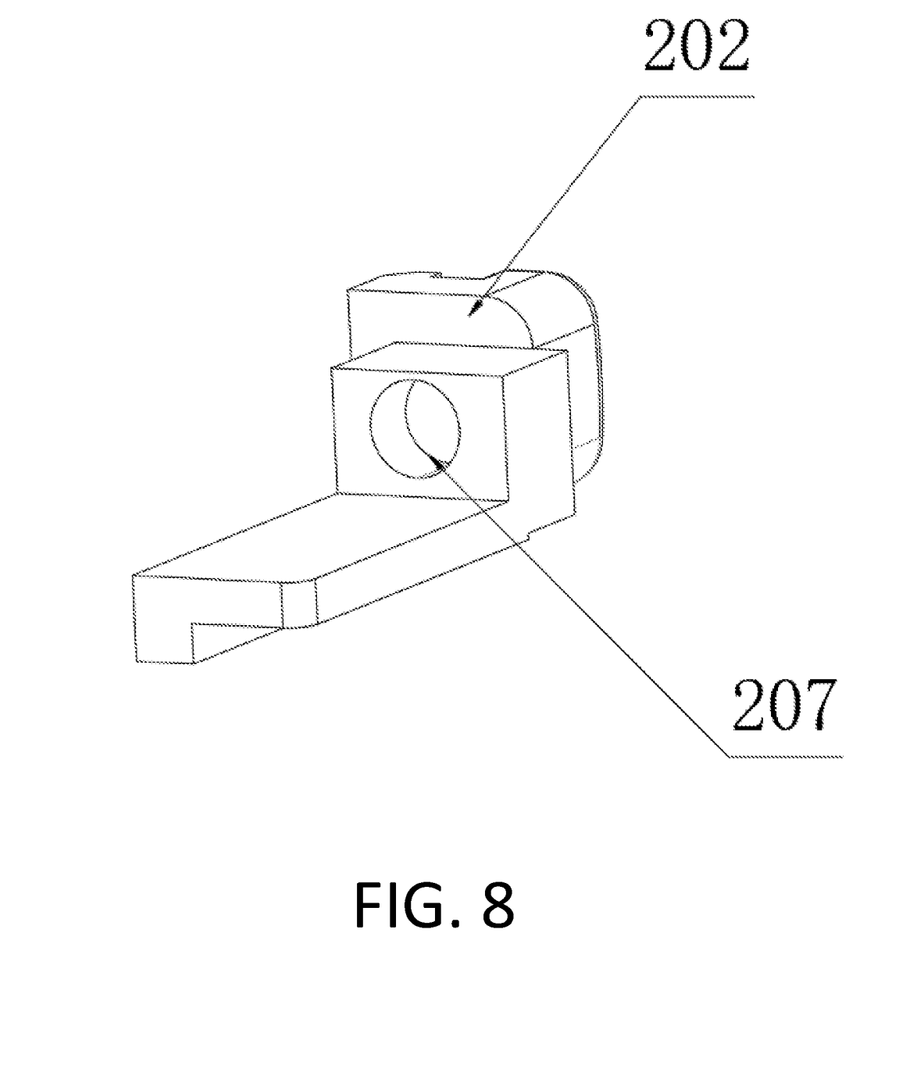
FIG. 8 is the isometric schematic side view of the pressing block B.

Referring to FIGS. 1, 2, and 5, the numbers of positioning grooves 104 could be four, six, eight and etc., and the positioning grooves 104 are evenly distributed on the sliding track 103; the fan 1 includes the fan shell 101, the fan top inner cavity 102, the sliding track 103, and the positioning groove 104; the pressing block A 201, pressing block B 202, and compression spring 204 could achieve the effect of compression. During the compressed state, the compression spring 204 could achieve compression effect, the pressing block A 201 and pressing block B 202 are in the compressed state in the sliding track 103, it is convenient for the double buckles 2 to be inserted into the sliding track 103. After the double buckles 2 rotate until aligning to the positioning groove 103, pressing block A 201 and pressing block B 202 are compressed and rebounded by the compression spring 204, in order to clamping with the positioning groove 103, and then the compression spring 204 return to its original state, and the entire blind installation process is completed. The pressing block A 201 and the pressing block B 202 are positioned oppositely and arranged in the H-shape, the compression spring 204 is located in the H-shaped groove between the pressing block A 201 and the pressing block B 202. The double buckles 2 comprise the pressing block A 201, the pressing block B 202, the buckle cover plate 203, the compression spring 204, the installation base 205, the fixing bottom plate 206, and the circular hole 207. At the same time, when disassembly is required, press down on pressing block A 201 and pressing block B 202, then under the action of compression spring 204, the pressing block A 201 and the pressing block B 202 could be separated from the positioning groove 103, making it easier for double buckles 2 to separate from fan 1. The overall installation process could be more time-saving and labor-saving. Meanwhile, there is a spring in the middle of the double buckle, which could be reset through the spring, making the use of the double buckles more convenient; Moreover, the fan could rotate even after being clamped tightly, making disassembly more convenient. The overall usage effect is better, and installation can be completed quickly and randomly. The installation base 205 includes the base shell 2051, the installation inner cavity 2052, the middle partition plate 2053, and the fixing column 2054.

It should be noted that the present invention is a fan with double easy-installing buckles, comprising 1. the Fan; 101. Fan shell; 102. Fan top inner cavity; 103. Sliding track; 104. Positioning groove; 2. Double buckle; 201. Pressing block A; 202. Pressing block B; 203. Buckle cover plate; 204. Compression spring; 205. Installation base; 2051. Base shell; 2052. Installation inner cavity; 2053. Middle partition plate; 2054. Fixing column; 206. Fixing bottom plate; 207. Circular hole; 3. Supporting bracket. The components are all common standard parts or components known to those skilled in this field, and their structures and principles can be known to those skilled in this field through technical manuals or conventional experimental methods.

The working principle of the present invention is: The present invention could solve the problems that the traditional fans cannot be quickly and randomly installed and cannot be directly clamped during use, the double buckles in this invention could achieve the effect of clamping directly and could effectively avoid the requirements of aligning the buckles with the holes during installation. Which could be more convenient during the blind installation process. At the same time, multiple positioning grooves 104 and sliding tracks 103 are provided, which could facilitate the directly connection between double buckles 2 and fan 1. During blind installation, the fan 1 is connected with double buckles 2, firstly, inserted into the sliding track 103, and then rotated until connected with positioning groove 104, it could be clamped and the randomly installation could be achieved. Multiple positioning grooves 104 are provided to enhance the clamping effect, and the overall clamping process could be smoother. The installation inner cavity 2052 is provided inside the base shell 2051, which clamps the pressing block A 201, pressing block B 202, and compression spring 204 together; the compression spring 204 is set in the H-shaped groove between the pressing block A 201 and the pressing block B 202, the compression spring 204 is fixed in the circular hole 207, makes it become more stable and avoid causing displacement in position, which facilitates installation and prevents the compression spring 204 from jumping out during compression, enhancing the effectiveness of use. The pressing block A 201, pressing block B 202, and compression spring 204 could achieve the effect of compression. During the compressed state, the compression spring 204 could achieve compression effect, the pressing block A 201 and pressing block B 202 are in the compressed state in the sliding track 103, it is convenient for the double buckles 2 to be inserted into the sliding track 103. After the double buckles 2 rotate until aligning to the positioning groove 103, pressing block A 201 and pressing block B 202 are compressed and rebounded by the compression spring 204, in order to clamping with the positioning groove 103, and then the compression spring 204 return to its original state, and the entire blind installation process is completed. At the same time, when disassembly is required, press down on pressing block A 201 and pressing block B 202, then under the action of compression spring 204, the pressing block A 201 and the pressing block B 202 could be separated from the positioning groove 103, making it easier for double buckles 2 to separate from fan 1. The overall installation process could be more time-saving and labor-saving; At the same time, there is a spring in the middle of the double buckle, which could be reset through the spring, making the use of the double buckles more convenient; Moreover, the fan could rotate even after being clamped tightly, making disassembly more convenient. The overall usage effect is better, and installation can be completed quickly and randomly.

Hereinafter, embodiments of the present invention has been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A fan with double easy-installing buckles, comprising a fan (1), a fan shell (101), an installation base (205), a base shell (2051), and a middle partition plate (2053),
wherein one end of the fan (1) is sleeved with the double buckle (2), and one end of the double buckle (2) far away from the fan (1) is sleeved with a supporting bracket (3); the top of the fan shell (101) is equipped with a fan top inner cavity (102), the inner cavity (102) at the top of the fan is equipped with a sliding track (103) and a positioning groove (104); the bottom surface of the installation base (205) is thread connected to a fixing bottom plate (206); the top surface of the installation base (205) is provided with a pressing block A (201), a pressing block B (202), and a compression spring (204); the top surface of the pressing block A (201), pressing block B (202) and the compression spring (204) are thread connected to the buckle cover plate (203), and both the pressing block A (201) and the pressing block B (202) are internally provided with circular holes (207); both sides of the middle partition plate (2053) are equipped with fixing columns (2054), the bottom of the middle partition plate (2053) is fixedly connected to the base shell (2051), the base shell (2051) is provided with the installation inner cavity (2052), and installation inner cavity (2052) is internally fitted with the supporting bracket (3).

2. A fan with double easy-installing buckles according to claim 1, wherein the numbers of positioning grooves (104) includes four, six, eight and the positioning grooves (104) are uniformly distributed on the sliding track (103).

3. A fan with double easy-installing buckles according to claim 1, wherein the fan (1) comprises the fan shell (101), the fan top inner cavity (102), the sliding track (103), and the positioning groove (104).

4. A fan with double easy-installing buckles according to claim 1, wherein the pressing block A (201) and the pressing block B (202) are oppositely arranged, and the pressing block A (201) and the pressing block B (202) are distributed in the H-shape, with the compression spring (204) positioned in the groove of H-shaped between the pressing block A (201) and the pressing block B (202).

5. A fan with double easy-installing buckles according to claim 1, wherein the double buckle (2) comprises the pressing block A (201), the pressing block B (202), the buckle cover plate (203), the compression spring (204), the installation base (205), the fixing bottom plate (206), and the circular hole (207).

6. A fan with double easy-installing buckles according to claim 1, wherein the installation base (205) comprises the base shell (2051), the installation inner cavity (2052), the middle partition plate (2053), and the fixing column (2054).

\* \* \* \* \*